United States Patent [19]
Nissel

[11] 3,940,221
[45] Feb. 24, 1976

[54] THICKNESS CONTROL SYSTEM FOR AN EXTRUSION DIE

[75] Inventor: Frank R. Nissel, Ambler, Pa.

[73] Assignee: Welex Incorporated, King of Prussia, Pa.

[22] Filed: Sept. 10, 1973

[21] Appl. No.: 396,008

[52] U.S. Cl. ............... 425/141; 425/143; 425/381; 425/466
[51] Int. Cl.² .......................................... B29F 3/04
[58] Field of Search ........... 425/466, 141, 144, 143, 425/461, 381, 384, 378 R, 379 R; 264/40; 164/280

[56] References Cited
UNITED STATES PATENTS

| | | | |
|---|---|---|---|
| 2,938,231 | 5/1960 | Lowey, Jr. | 425/466 |
| 3,531,827 | 10/1970 | Dragonnette | 425/141 |
| 3,694,119 | 9/1972 | Scheibling | 425/381 X |
| 3,782,873 | 1/1974 | Lynnknowles | 425/466 X |
| 3,835,209 | 9/1974 | Karabedian | 425/384 X |

Primary Examiner—Francis S. Husar
Assistant Examiner—Mark Rosenbaum

[57] ABSTRACT

A die having a controllable lip opening, through which flowable material is forced to form a sheet, film or tube. Lip opening control means including an elongated member which expands and contracts thermally and adjusts the lip opening to control the product thickness, and heating means is provided for controlling this expansion and contraction.

24 Claims, 9 Drawing Figures

THICKNESS CONTROL SYSTEM FOR AN EXTRUSION DIE

BRIEF SUMMARY OF THE INVENTION

This invention relates to an extruder die for sheet, tube or film made of a flowable material, such as thermoplastic material, paper pulp, molten glass, metal extrusion, coated materials such as paint and the like, to form continuous sheets, tubes or films with controlled thickness profile.

DISCUSSION OF THE PRIOR ART

Heretofore, flat sheet, film or tube extrusion dies have been provided with various mechanical means for adjusting the die lip in order to provide a controlled film, sheet or tube thickness. Heretofore, this has sometimes been accomplished for sheet or film by providing either a movable lip or a yieldable lip which is composed of a somewhat elastic material such as steel or the like, having a narrowed portion adjacent to the lip in order to provide flexibility. It has been conventional, as indicated schematically in FIG. 1 of the drawings, to apply a plurality of bolts, spaced apart from each other along a movable part M of the lip, so that each bolt can be adjusted individually in a manner to apply its own individual force ($f$) to control the lip opening ($o$) relative to fixed lip portion ($F$) at each one of the spaced points along the lip.

Figure 2:
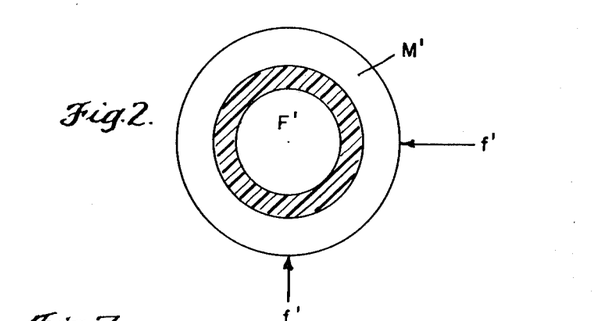
FIG. 2 is a similar view showing the extrusion of tube.

Similarly, the sheet or film thickness in tubular products can be controlled, as indicated in FIG. 2, by using forces $f,f'$ for controlling the movement of a movable outer tube $M'$ relative to a fixed inner piece $F'$. This provides a centering function.

In referring to such adjustments for sheet, film or tubing, the word "sheet" will be used in the interest of brevity, to cover all three. Thus, the word "sheet" is intended to cover thicknesses within the range of about .0003 inch to about 1 inch or more. Further, the word "width" means the width of a sheet from edge to edge, or when the edges join to form a tube, the "width" of the sheet means the circumference of the tube.

Such adjustments as referred to above have had the purpose of controlling the uniformity of thickness across the sheet, and to "trim" the die in a manner to adjust and control the sheet profile. Usually, this control has been accomplished by taking a sample of the sheet as it is being produced and measuring its thickness at various points along its width by using a micrometer, a beta-ray gauge, an X-ray gauge or the like. Having made such measurements, the operator then uses a wrench in order to adjust the individual bolts to such positions as, in his judgment, will correct the profile of the sheet. However, this involves a considerable amount of human judgment and guesswork, and has resulted in the production of large quantities of off-measurement sheet.

Hydraulic or electric motors have also been used to turn the lip-controlling adjusting nuts or bolts. For example, one apparatus of this type uses a hydraulic or electric motor and a turning device which indexes from position to position across the die and makes adjustments of nuts or bolts using mechanical forces according to the operator's judgment. Here again, the adjustments are based upon an evaluation of a strip taken from previously produced sheet. Further, the inevitable presence of backlash between the nut and the bolt, between either of these and the mechanism turning it, and elsewhere, interferes with accuracy of adjustment.

Furthermore, when using a hydraulic or electrical mechanism a space problem arises, particularly in the usual sheet extruder which is provided with a roll that receives the sheet as it emerges, which roll limits the space in which the mechanism can operate. The fact that sheet extrusion usually takes place in a hot environment further complicates the space problem, since there are certain areas that are not accessible to human operators and frequently bolts are either completely inaccessible or at best very difficult to reach.

The U.S. Pat. to Lowey, Jr. No. 2,938,231 discloses the idea of utilizing resistance heating wires in conjunction with elongated bolts, in order to slide the separate lip members of a plastic extrusion die toward and away from each other, in order to regulate the lip opening. However, such an apparatus produces unbalanced performance since quick response is obtained when the die lip is adjusted in one direction, but the response in the reverse direction is so slow as to produce substantial and troublesome lack of uniformity in the thickness of the extruded sheet product.

OBJECTS OF THE INVENTION

It is accordingly an object of this invention to provide a readily controllable means for accurately adjusting the lip opening of a die in both the opening and the closing direction to produce an accurately controlled sheet thickness which may be uniform all across the width of the sheet.

It is another object of the invention to provide controlling means of an automatic nature which senses the variations of thickness of the continuously running sheet without interfering with continuity of production, and which automatically adjusts the die lip opening at points where adjustment is required, in a manner to provide continuously a precision controlled sheet thickness contour all across the width of the sheet.

Other objects and advantages of this invention will further become apparent in the drawings and in the description which follows.

DETAILED DESCRIPTION OF THE DRAWINGS

Although specific terms will be used in describing the specific forms of the invention selected for illustration in the drawings, these are not intended to limit the scope of the invention which is defined in the appended claims.

Figure 1:
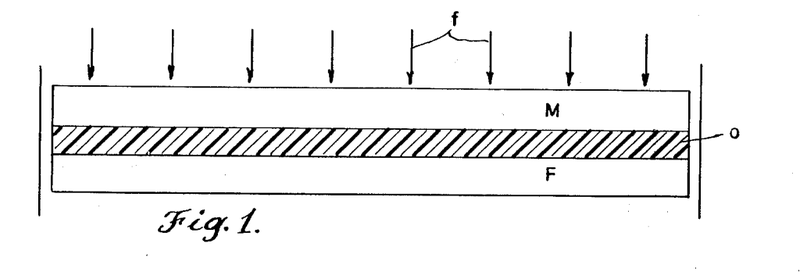
FIG. 1 is a schematic end view showing a typical die lip through which sheet is extruded.

The operation of the die lips schematically shown in FIGS. 1 and 2 may, of course, be performed manually as in the prior art, but great advantages are attained by controlling the die lip contour as will now be described.

Figure 3:
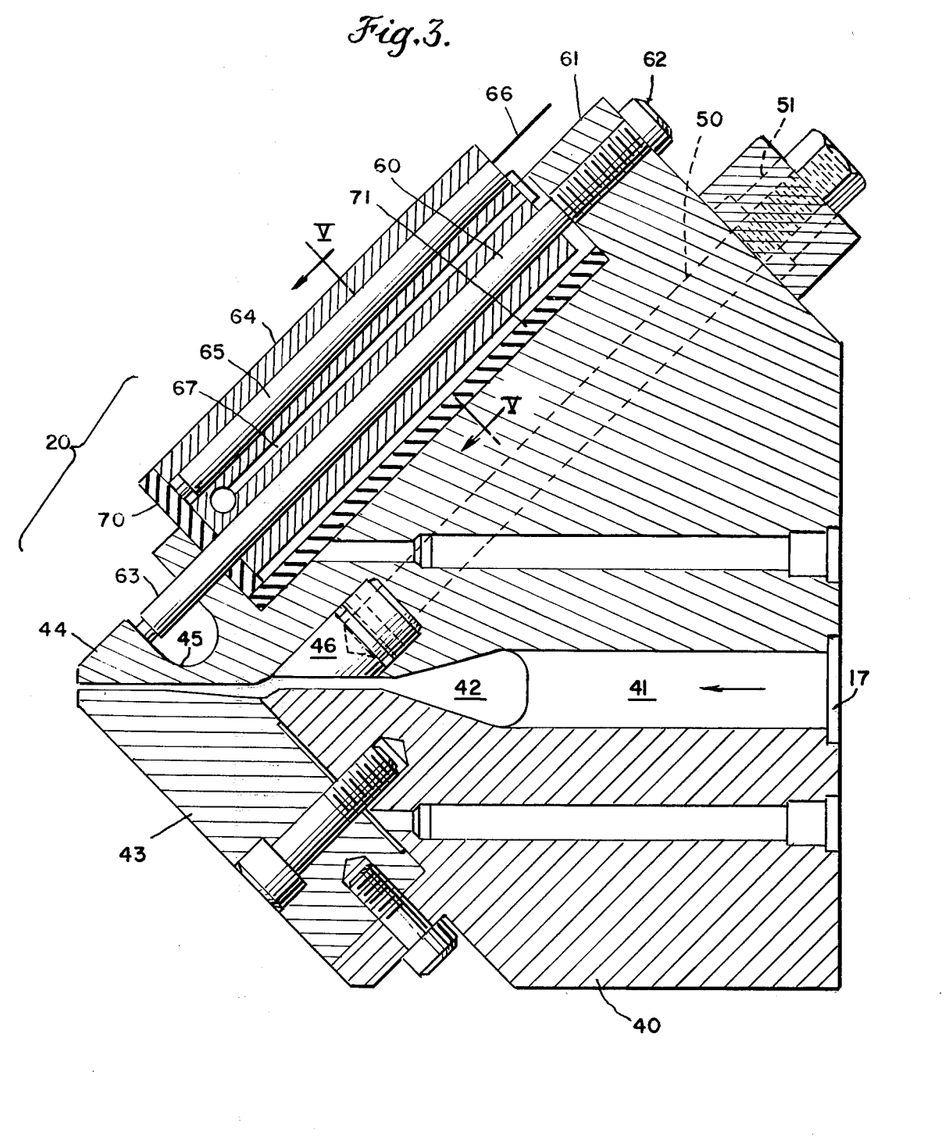
FIG. 3 is a sectional view taken through a sheet extruder die, showing details of a preferred embodiment in accordance with this invention.

FIG. 3 shows, in cross section, a particular form of lip control device which is highly advantageous in accordance with this invention. This form happens to be adapted to produce flat film or sheet. The number 40 designates a metal block having a passageway 41 arranged to receive the flowable material which moves in the direction indicated by the arrow, from any source such as an extruder outlet 17, and has a necked down portion 42 enabling the flowable material to spread sidewardly (while it is also moving longitudinally) to assume the width that is required for the desired sheet. The number 43 designates the lower lip portion of the die 20, and the number 44 designates the upper lip portion which has a necked down portion 45 allowing flexibility of the upper lip 44 for fine adjustment. The number 46 designates an optional choker bar which is mounted upstream of the lips 43, 44 and which serves to equalize and distribute the pressure drop of the plastic material as it flows sidewardly in the die, as heretofore discussed. A plurality of bolts 50 with adjusting nuts 51 are provided for manually adjusting the choker bar 46 at various points across the width of the sheet extruder die 20.

In accordance with this invention, novel means are provided for critically adjusting the opening between the lips 43, 44. An elongated metal rod 60 which is threaded through a projection 61 on the block 40 and has a head 62 engageable by a wrench, has its operating end 63 in contact with the flexible upper lip 44. The metal rod 60 extends through an individual heater block 64 which contains a heater plug 65 which is electrically connected by a wire 66 to an energizing source, not shown, providing heat to the plug 65 and, by convection, to the entire heater block 64. The heater block 64 also includes a bore forming an air passage 67 through which air is continuously passed in accordance with this invention. The numbers 70, 71 designate layers of insulation which limit the flow of heat between the die block 40 and the rod 60, so that the function of each is substantially independent thermally of the other.

It will be apparent that the elongated rod 60 is made of a metal such as steel, for example, having a definite and constant coefficient of thermal expansion and contraction. Accordingly, once an initial adjustment has been made by a mechanical turning of the head 62 of rod 60, the rod 60 is then adapted for precise and automatic continuous thermal adjustment of the flexible lip 44. When the thickness of the sheet that is being extruded between the lips 43 and 44 is excessive, the electric wire 66 is energized causing the heater 65 to emit heat which is conveyed by conduction to the elongated rod 60, raising its temperature and causing it to expand. Since the upper end of the rod 60 is threaded to the projection 61 and is thus fixed while the lower end 63 is free to move, the lower end 63 is forcibly displaced in an axial direction, pressing upon the flexible lip 44 and bending it slightly for swinging movement around the necked down portion 45 to narrow the gap between the lips 43, 44, thus decreasing the thickness of the sheet subsequently extruded. Similarly, when the extruded sheet is too thick, the wire and heater 65 are deenergized and the air (which is continuously flowing through the passage 67) rapidly cools the elongated rod 60, causing its lower end 63 to withdraw, and permitting the inherent springiness of the metal of the flexible lip 44 to swing it through a precisely controlled arc away from the lip 43, thus controllably increasing the thickness of the sheet.

Figure 4:
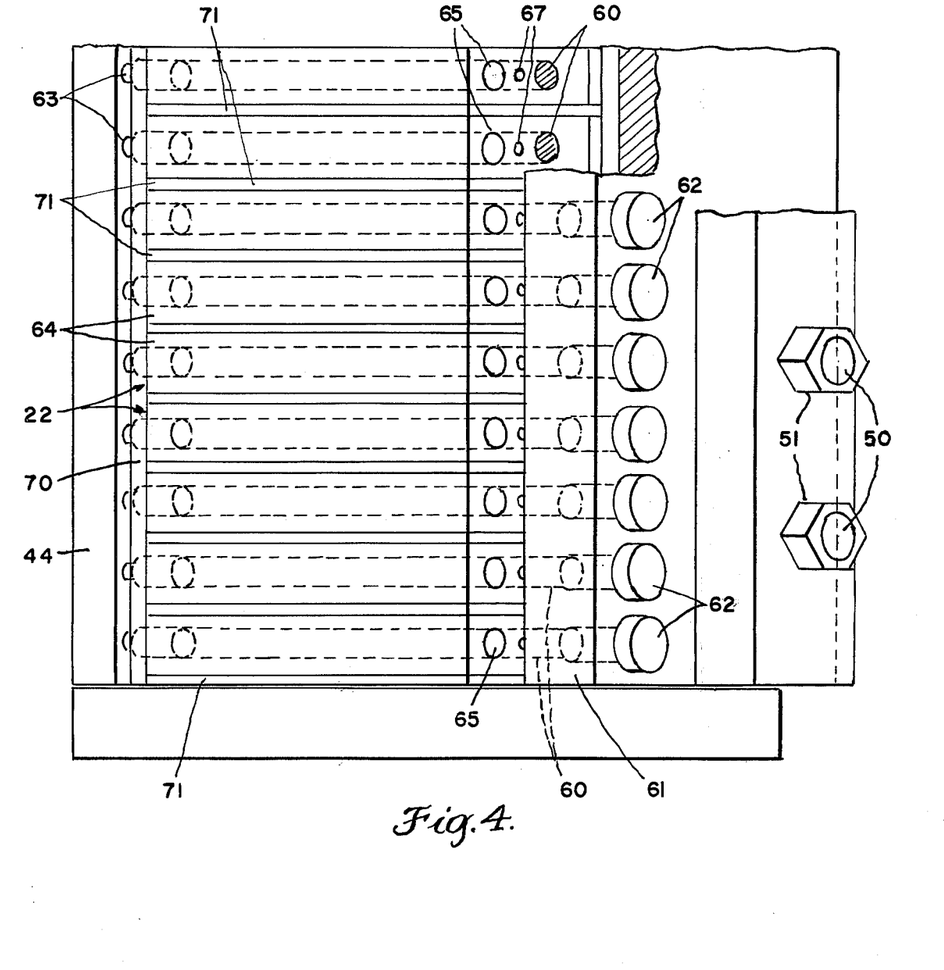
FIG. 4 is a fragmentary plan view of the extruder die appearing in FIG. 3.

It will be appreciated that FIG. 3 shows only one such automatic controlling station, and that many such stations are arranged in a predetermined spaced relationship all across the width of the sheet extruder die. Referring to FIG. 4, a plurality of such stations 22 appear in plan view.

Figure 5:
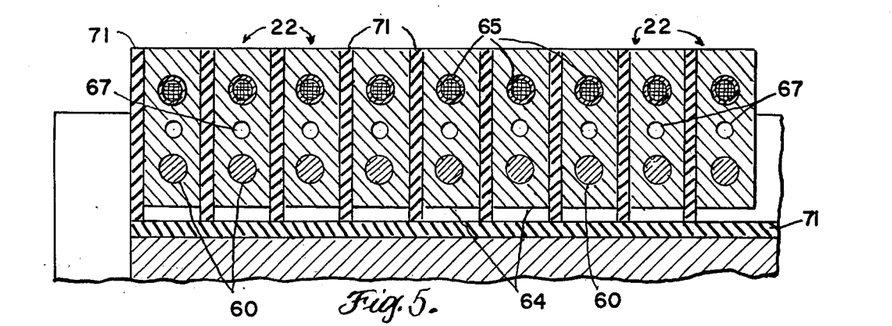
FIG. 5 is a sectional view taken as indicated by the lines and arrows V—V which appear in FIG. 3.

Referring to FIG. 5, it will be appreciated that each station 22 is insulated from its neighbors by layers of insulation 71 and that each such station includes an individual elongated rod 60, an individual air passage 67 and an individual heater plug 65.

In the operation of the apparatus according to this invention, the opening of the die lip is normally preset by mechanical adjustment in an approximately parallel manner, using a feeler gauge to check the parallelism. Also, in those optional situations where choker bars are useful, rough adjustments are made mechanically with the choker bars in order to provide initial settings which are close (plus or minus about 10%) to the desired final adjustment. Then the sheet extruding process is begun. After steady state conditions have been reached, measurements are taken along the width of the sheet and the errors or deviations from the desired thickness are fed as signals to the individual heaters 65, thus applying fine adjustments all across the width of the sheet, to produce a sheet having remarkably uniform thickness all across. As previously stated similar advantages apply as well to film and to tubing, all referred to generically as "sheet".

The elongated rod 60 may, for example, have a length of about six inches and may be made of ordinary carbon steel, although other metals are also suitable. The coefficient of thermal expansion of steel is sufficient to give a range of adjustment of about eighteen thousands of an inch, which is more than adequate. In the operation of the apparatus of this invention, there is no backlash as in the case with mechanical adjustments and corrections. Both in the die opening and die closing directions all movements occur continuously and virtually to an exact degree of precision. The adjusting member is moved promptly and in the correct amount, by heating or cooling the expandable band or rod. Indeed, some stations may be heating while others may be cooling at a given time.

Figure 9:
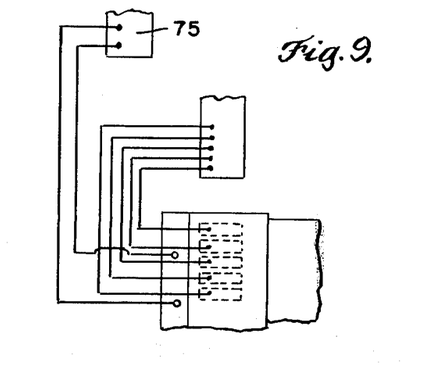
FIG. 9 is a schematic view of an alternate control means embodying features of this invention.

If desired, the same type of compensating means may be applied to the choker bar as well as to the die lip. Such an arrangement appears schematically in FIG. 9 of the drawings, where the number 75 designates a control box for the choker bars, operating to send an electrical error signal to control heaters operatively associated with expendable members such as bolts 50 of FIG. 3.

Figure 6:
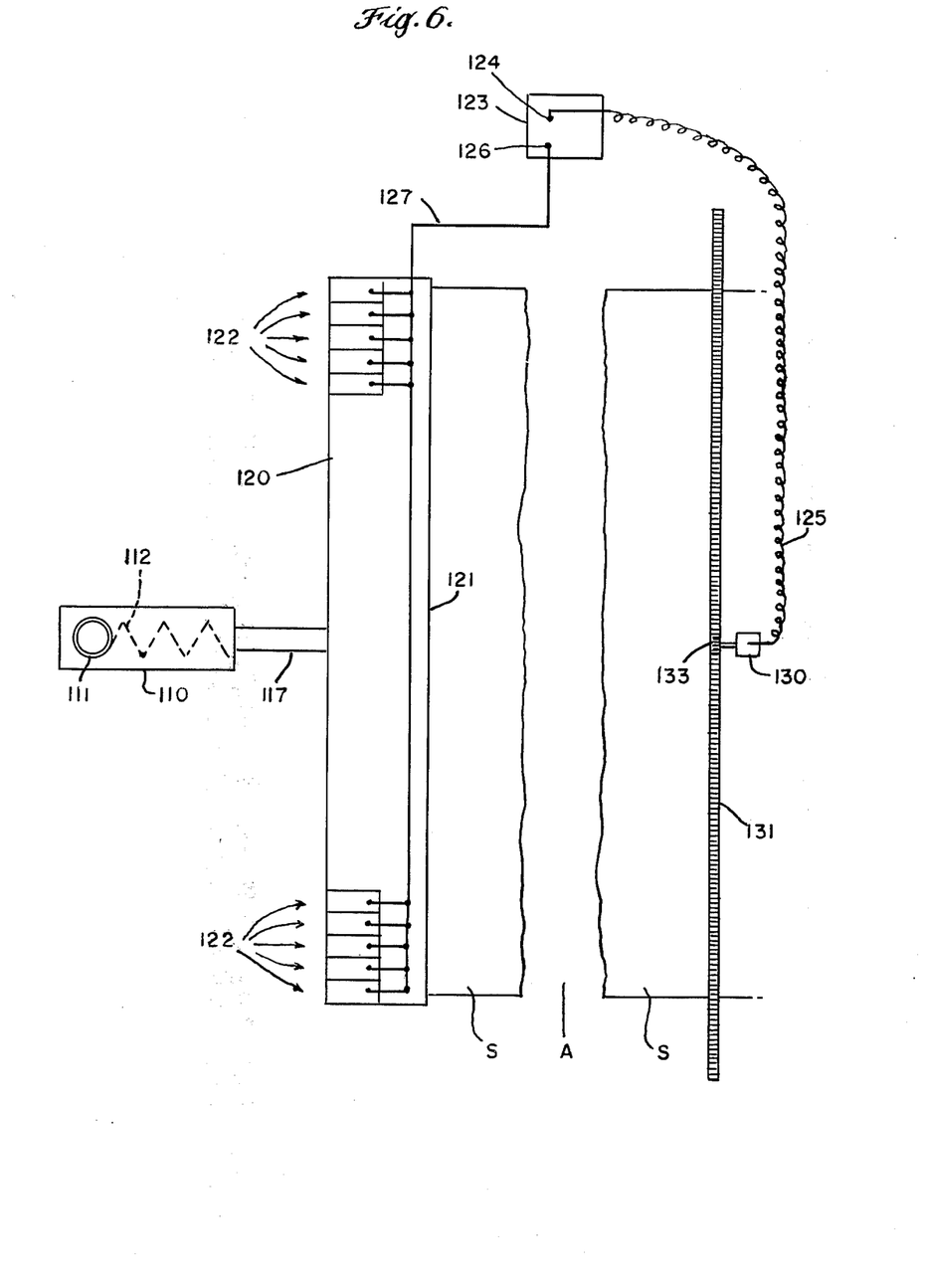
FIG. 6 is a schematic plan view showing a typical sheet extrusion die, and showing the general arrangement of a sheet extruder scanning and control apparatus which embodies features of this invention.

Turning now to FIG. 6, which shows an overall apparatus designated to operate automatically, the number 110 designates an extruder having a hopper 111 into which plastic material is introduced and forwarded under pressure under the influence of a helical worm 112 which is driven in rotation in a conventional manner within the extruder 110. It should be understood that an extruder is only one example of a device for forwarding a flowable material; it is optional in accordance with this invention. In any event, the flowable material flows continuously through the outlet 117 of the extruder to a sheet extrusion die 120 which is connected to receive the flowable material coming from the outlet 117. The material flows out sidewise as well as lengthwise since the sheet extrusion die 120 has a width which is much greater than that of the outlet 117. The die 120 has a lip 121 through which the material flows in a manner to produce continuously a sheet S, which is shown broken in FIG. 6 to indicate an area A in which the sheet is cooled. Details with respect to the construction and operation of one form of the lip 121 have been provided in the discussion of FIGS. 3–5.

Still referring to FIG. 6, it will be observed that there are a plurality of stations 122 at spaced intervals all across the width of the sheet extruder die 120, each being a control station for controlling the lip opening in that area. It will be noted that a control box 123 is provided adjacent to the sheet extrusion die 120 and that it has a terminal 124 for receiving impulses from a helically wound expandable electric cord 125 which carries individual impulses, as will be explained hereinafter, which are proportional to the thickness of the cooled sheet S at various stations, all as it is being produced continuously. The control box 123 also has a composite output terminal 126 to which is connected a group of individual wires 127 each of which is connected individually to one of the stations 122 on the die 120, with ability to make adjustments locally to control the opening of the lip 121 for each station 122.

A scanning device generically designated 130 is mounted for movement along a cog rail 131, and is driven back and forth by its own motor adjacent to the sheet S, to measure the thickness of the sheet S at locations corresponding to the individual stations 122 on the sheet extruder die 120. It will be appreciated that the scanning device 130 is moved continuously back and forth across the entire width of the sheet S; that it continuously makes measurements of the error of sheet thickness at each station, that by means of expandable cord 125 it automatically actuates an electrical error signal to the control box 123 for each station, and that the control box 123 automatically relays the signal through the wires 127 to each control station 122 in a manner automatically to energize or de-energize the correct wire 66 to control the thickness of the die lip at each station. The scanning device 130 includes a counter, actuated by the cogs on rail 131, which automatically actuates the correct individual wire which corresponds to the station at which the measurement was made, as is well known in the electrical art.

Figure 7:
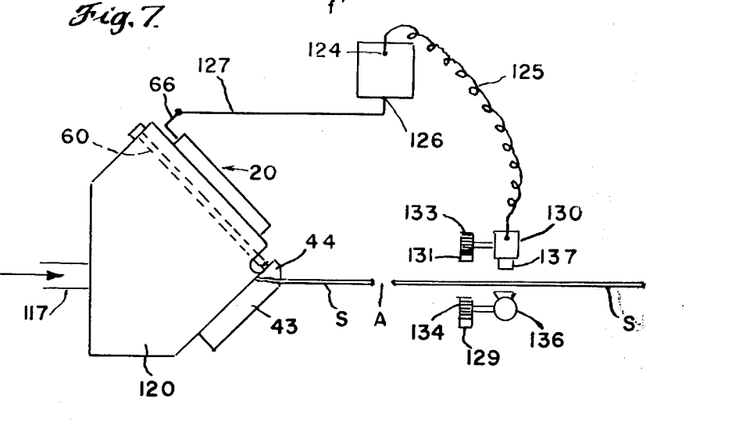
FIG. 7 is a schematic view in side elevation showing the die and a controlling apparatus comprising a portion of the apparatus appearing in FIG. 6.

Referring to FIG. 7, the scanning means is mounted to ride upon a support (not shown) located outwardly beyond the edges of the sheet S, and carries a radiation detector 137 which receives a signal from a radiation source 136 mounted to run by cog 134 on a similar cog rail 129 directly below the scanning receiver 137 so that the scanner and receiver travel in a synchronized manner together, one vertically above the other, in a reciprocating path across the sheet S and back again, always counting revolutions so the position of the scanner and receiver is always reported corrected to the control box, all without interfering with the continuity of the sheet.

In one embodiment of this invention, the beam emitter 136 is a beta-ray emitter and the scanner 137 is a beta-ray receiver. Since the presence of the sheet tends to cut down the transmission of beta-rays from the emitter to the scanner, the extent to which this transmission is cut down varies in proportion with the thickness of the sheet. Accordingly, readings taken by the scanner at individual stations across the width of the sheet vary according to variations of sheet thickness and provide an excellent basis for the automatic control apparatus heretofore described.

Figure 8:
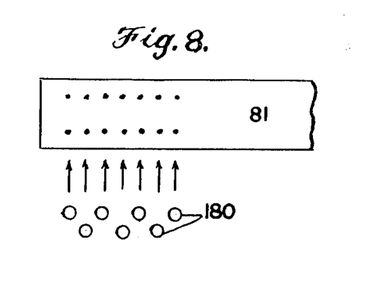
FIG. 8 is a diagrammatic view of an alternate form of control means in accordance with this invention.

Although this invention has been described in relation to a completely automatic apparatus wherein a scanner feeds a signal to each heater in order automatically to adjust the die lip opening in response to a measured sheet thickness, in some cases a semi-automatic apparatus may be used, such as that illustrated in FIG. 8. FIG. 8 schematically illustrates a control board having a plurality of rheostats 180, which may be operated by a human operator in response to thickness readings for each position or station across the sheet, such thickness readings being taken by the scanner 137 of FIG. 7 and simply displayed as numerical indicia on a chart such as the chart 81. Each rheostat 180 is, of course, connected to an electric circuit for controlling the heating that is applied to a particular elongated rod 60 at a particular station along the lip of the die.

Although this invention has been described in conjunction with a flexible lip, it can also be applied to lips of other types, including those having a member which is slidably arranged for movement back and forth with respect to the block 40. However, the flexible lip is preferred in view of the complete absence of backlash, and because of its quick response and precision adjustment.

It is important, in accordance with this invention, that the individual stations be thermally insulated from each other and from the die, so that no individual station affects the operation of its neighbor, and so that the stations as a whole do not materially affect the temperature of the die itself, which temperature is desirably controlled individually in order to attain optimum conditions for extruding the particular plastic material that is involved.

The cooling means in accordance with this invention is important as well; since control in one direction is achieved by heating, it is also important to be able to cool and it has been found particularly advantageous to run cooling air through a bore in the center of the block. This provides rapid heat loss at a constant rate when called for.

The fine differences with regard to lip spacing that are achieved in accordance with this invention make a great difference in the uniformity of the sheet, and in its physical properties and appearance.

Although the measuring device referred to and described in the drawings may be a beta-ray gauge which utilizes the principle of absorption through a sheet using a weakly radioactive source, all of which is well known per se, various other measuring means may be used, including feeler gauges which are based on resistance to air flow as a function of the variations of sheet thickness, X-ray gauges, and a wide variety of other devices which are of themselves well known in the art. It will be appreciated, also, that it is not always necessary to heat the die lips themselves, or even to heat the flowable material, unless heat is necessary to maintain it in a flowable condition.

Various modifications may be made within the spirit and scope of this invention, including the substitution of equivalent elements, the reversal of parts, the use of certain features independently of other features, all as defined in the appended claims.

The following is claimed:

1. In an extrusion die for continuously producing a sheet of material that has a substantial width in comparison to its thickness, the combination which comprises: means forming a slit which extends along the width of said die, said slit having an opening of variable thickness, means continuously forcing said material through said slit to form said sheet, slit opening control means including a plurality of spaced-apart elongated members each having capacity to expand and contract thermally, and each operatively arranged to adjust the slit opening at an individual location to control the sheet thickness at said location, a plurality of individual cooling means each connected and structurally located in heat exchange relationship with one of said elongated members upstream of said slit opening for positively cooling said elongated member, and a plurality of individual heating means also connected and structurally located in heat exchange relationship with each said elongated member to heat each said elongated member, means for individually alternately actuating and deactivating said heating means, said heating means having capacity to overcome the cooling of said cooling means on the elongated member with which they are associated, insulating means interposed between said die and both said heating and cooling means, such that the functions of said elongated members and the remainder of the die are substantially thermally independent of each other.

2. The die defined in claim 1, wherein the cooling means includes a continuous stream of air, and means for flowing said air along and in heat exchange relationship with said elongated member in a manner to cool and to contract said elongated member lengthwise.

3. The die defined in claim 1 wherein a plurality of said slit opening control means are in the form of elongated metal rods provided at spaced apart locations along said slit, and wherein a separate unit of said heating means and a separate unit of said cooling means is arranged in heat conducting relationship with each of said elongated members.

4. The die defined in claim 1 wherein said slit includes a portion which is bendable under the influence of mechanical force, and wherein said lip opening control means includes an elongated metal member which is physically connected to apply such a bending force under the influence of sufficient heat and cooling to cause thermal expansion and contraction of said metal.

5. The die defined in claim 1 wherein a plurality of heater blocks are provided through which a plurality of said elongated metal members extend, each said heater block being in heat exchanging relationship with a corresponding one of said elongated metal members to provide heat to further elongate said elongated metal member.

6. The die defined in claim 5 wherein means are provided for selectively heating said heater block to selectively elongate said elongated metal member.

7. The die defined in claim 6 wherein said cooling means are constructed and arranged for contact cooling with said heater block.

8. The die defined in claim 1 wherein said cooling means is continuous but said heating means is connected to operate selectively and intermittently.

9. The die defined in claim 5 wherein said heater block has three substantially parallel elongated bores, one containing said elongated metal member, another containing a heater plug, and the other providing a passage for cooling air.

10. The die defined in claim 1 wherein scanning means are provided for sensing the thickness of said sheet at a given location along said lip, and wherein automatic means is connected to control said lip opening control means in response to said scanning means.

11. The die defined in claim 10 wherein a plurality of said lip opening control means are provided at predetermined stations located along said lip, and wherein said scanning means are arranged to sense said sheet thickness at each of said stations and to control said control means at each corresponding station.

12. The die defined in claim 1 wherein thickness measuring means is positioned downstream of said slit and in line with said slit opening control means.

13. The die defined in claim 12, wherein said measuring means includes a thickness indicating means.

14. The die defined in claim 10, wherein said scanning means includes an emitter and a receiver of rays which are transmitted partially through said sheet.

15. The die defined in claim 14 wherein said rays are beta-rays.

16. The die defined in claim 14 wherein automatic control means is provided at a multiplicity of stations spaced apart from one another across the width of said sheet, and where said scanner includes means for determining relative thickness of said sheet at each of said stations and for providing indicia representing such thickness at each of said stations.

17. The die defined in claim 16 wherein said automatic control means is also operative to introduce heat controllably into each of a multiplicity of heaters located in said lip opening control means at each of said stations.

18. The die defined in claim 10, wherein said scanning means includes a pair of parallel trackways extending across said sheet, one above and the other below, and wherein means are provided for moving an emitter and a receiver of sheet-penetrating rays in synchronization back and forth across said sheet to measure the thickness of said sheet at prescribed intervals.

19. The die defined in claim 1, wherein a controllable weir is provided upstream of said lip.

20. The die defined in claim 19 wherein a plurality of said weirs are provided, spaced apart from one another across said sheet extruder.

21. The die defined in claim 1 wherein insulating means is provided between said heating means and said lip.

22. The die defined in claim 1, wherein thermal insulating means includes a layer of insulating material interposed between said die and said cooling means.

23. The die defined in claim 1, wherein thermal insulating means includes a layer of insulating material interposed between said die and said heating means.

24. The die defined in claim 1, wherein thermal insulating means includes a layer of insulating material interposed between said die and said both heating and cooling means.

* * * * *

REEXAMINATION CERTIFICATE (2068th)
United States Patent [19]
Nissel

[11] B1 3,940,221
[45] Certificate Issued Jul. 27, 1993

[54] THICKNESS CONTROL SYSTEM FOR AN EXTRUSION DIE

[75] Inventor: Frank R. Nissel, Ambler, Pa.

[73] Assignee: W Bar E, Inc., Marianna, Fla.

Reexamination Request:
No. 90/002,483, Oct. 21, 1991

Reexamination Certificate for:
Patent No.: 3,940,221
Issued: Feb. 24, 1976
Appl. No.: 396,008
Filed: Sep. 10, 1973

[51] Int. Cl.⁵ .................................... B29C 47/16
[52] U.S. Cl. .............................. 425/141; 425/143; 425/381; 425/466

[58] Field of Search ............ 425/140, 141, 143, 144, 425/378.1, 381, 379.1, 384, 461, 466; 264/40.1, 40.2; 164/435

[56] References Cited

U.S. PATENT DOCUMENTS

| | | | |
|---|---|---|---|
| 2,938,231 | 1/1960 | Lowey, Jr. | 425/466 |
| 3,261,893 | 7/1966 | George et al. | 264/40.5 |
| 3,531,827 | 10/1970 | Dragonette | 425/141 |
| 3,694,119 | 9/1972 | Scheibling | 425/133.5 |
| 3,782,873 | 1/1974 | Lynnknowles | 425/141 |
| 3,835,209 | 9/1974 | Karabedian | 264/51 |

*Primary Examiner*—Richard L. Chiesa

[57] ABSTRACT

A die having a controllable lip opening, through which flowable material is forced to form a sheet, film or tube. Lip opening control means including an elongated member which expands and contracts thermally and adjusts the lip opening to control the product thickness, and heating means is provided for controlling this expansion and contraction.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 9 and 22-24 is confirmed.

Claims 1-8 and 10-21 are cancelled.

* * * * *